United States Patent [19]

Jackson

[11] Patent Number: 5,085,480
[45] Date of Patent: Feb. 4, 1992

[54] CAM OPERATED WORKPIECE ENGAGING APPARATUS

[76] Inventor: Donald T. Jackson, 1159 Ashley, Troy, Mich. 48098

[21] Appl. No.: 730,582

[22] Filed: Jul. 15, 1991

Related U.S. Application Data

[63] Continuation of Ser. No. 506,671, Apr. 9, 1990, abandoned.

[51] Int. Cl.$^5$ .............................................. B25J 15/00
[52] U.S. Cl. ...................................... 294/116; 294/88
[58] Field of Search .................... 294/116, 88; 269/32, 269/34

[56] References Cited

U.S. PATENT DOCUMENTS

| | | | |
|---|---|---|---|
| Re. 31,991 | 9/1985 | Decoteaux et al. | 294/116 X |
| 2,364,239 | 12/1944 | Parks | 90/60 |
| 2,378,570 | 6/1945 | Mitchell | 294/116 X |
| 2,641,806 | 6/1953 | Leckrone | 294/88 X |
| 2,850,926 | 9/1958 | Jobe | 77/63 |
| 3,084,893 | 4/1963 | Ruth | 248/228 |
| 3,170,322 | 2/1965 | Cavanaugh | 73/103 |
| 3,635,514 | 1/1972 | Blatt | 294/88 X |
| 3,714,870 | 2/1973 | Blatt | 294/88 X |
| 3,764,023 | 10/1973 | Jatcko | 294/88 X |
| 3,767,063 | 10/1973 | McKinven, Jr. | 294/88 X |
| 4,234,223 | 11/1980 | O'Neil | 294/88 |
| 4,294,444 | 10/1981 | Horton | 269/156 |
| 4,368,913 | 1/1983 | Brockmann et al. | 294/88 X |
| 4,518,187 | 5/1985 | Blatt et al. | 294/88 |
| 4,596,415 | 6/1986 | Blatt | 294/88 |
| 4,887,612 | 12/1989 | Esser et al. | 294/116 X |

FOREIGN PATENT DOCUMENTS

| | | | |
|---|---|---|---|
| 215739 | 11/1984 | Fed. Rep. of Germany | 294/116 |
| 1180806 | 6/1959 | France | 294/88 |
| 2223543 | 10/1974 | France | 294/88 |
| 776863 | 11/1980 | U.S.S.R. | 294/88 |
| 848353 | 4/1981 | U.S.S.R. | 294/88 |
| 966644 | 8/1964 | United Kingdom | 294/88 |

Primary Examiner—Margaret A. Focarino
Assistant Examiner—Joseph D. Pape
Attorney, Agent, or Firm—Basile and Hanlon

[57] ABSTRACT

A workpiece engaging apparatus includes a drive having a linearly reciprocal drive member. Two workpiece engaging members are arranged in opposed, inverted relationship with respect to each other and pivotally connected at one end to the drive. Each workpiece engaging member includes a workpiece engaging surface and at least one cam. In one embodiment, the cams in each of the first and second workpiece engaging members are identically constructed, but are disposed in opposed, inverted relationship with respect to the cams in the opposed one of the first and second workpiece engaging members. Cam follower members mounted on the linear drive member engage the cams during reciprocal movement of the drive member to pivot the workpiece engaging surfaces of the first and second workpiece engaging means between open and closed workpiece engaging positions. In another embodiment in which the apparatus is designed to perform a hemming operation on overlapping sheets, a first cam is formed in each of a pair of block members secured to the linear drive member. The block members are pivotally connected at a first end to the linear drive cylinder. Spaced, outer plates, each having a second cam formed therein, are also pivotally connected at one end to the linear drive cylinder and carry a workpiece engaging member at an opposite end. Linear movement of the cam follower driven by the linear drive member causes the outer plates to pivot between an open position and a closed, workpiece engaging position.

9 Claims, 4 Drawing Sheets

CAM OPERATED WORKPIECE ENGAGING APPARATUS

This application is a continuation of application Ser. No. 07/506,671, filed on Apr. 9, 1990, now abandoned.

BACKGROUND OF THE INVENTION

1. Field of the Invention

The present invention relates to workpiece engaging tools used in manufacturing operations and, specifically, to gripping, clamping, piercing and hemming devices for engaging and/or performing work on workpieces.

2. State of the Art

In manufacturing operations, various types of tools are employed to engage workpieces and/or to perform work on such workpieces. Typically, grippers and clamps are used to engage workpieces at the completion of one manufacturing operation and to remove such workpieces from one work station for subsequent transport to another work station or to a storage location.

In a typical stamping operation in which metal sheets are progressively formed to a final shape through a series of work operations in adjacently disposed stamping presses, grippers are employed to remove the metal sheet from each press and, in combination with additional parts handling equipment, to deposit the workpiece in an adjacent press or an intermediate idle station located between adjacent presses.

Typically, such grippers are formed of a number of interconnected pins and links which effect opening and closing of gripper jaws. Such mechanisms are complicated in construction and high in cost. Further, the pins and links of such grippers are employed to drive the gripper jaws into a position engaging the workpiece. This provides an inefficient and variable force to grip such workpieces.

In hemming applications, such as the manufacture of vehicle doors, deck lids, etc., the edge of one sheet of metal is bent around the edge of an upper disposed sheet to join the two sheets of metal together. Typically, a complex and elaborate machine is employed to bend the edge of the lower sheet about the upper sheet. Such machines utilize a complex arrangement of fluid cylinders and links to effect the bending of the metal sheet edge.

Thus, it would be desirable to provide a workpiece engaging apparatus for manufacturing operations which has a high workpiece engaging force and, yet, is simple in design. It would also be desirable to provide a workpiece engaging apparatus for manufacturing operations which can provide an infinite pressure to a gripped workpiece. It would also be desirable to provide a workpiece engaging apparatus for manufacturing operations which simplifies a hemming application in which the edge of one sheet of metal is bent around the edge of another sheet of metal.

SUMMARY OF THE INVENTION

The present invention is an apparatus for engaging workpieces which includes a linear drive means having a reciprocally extendable and retractable drive member. First and second workpiece engaging means, each having first and second ends, are arranged in opposed, inverted positions with respect to each other and pivotally connected together at the first ends to the linear drive member. First and second cam means are formed in the first and second workpiece engaging means, respectively. The first and second cam means are disposed in opposed relationship with respect to each other.

Cam follower means are mounted on the linear drive member and engage the first and second cam means in the first and second workpiece engaging means to pivot the first and second workpiece engaging means between first and second positions as the drive member reciprocates. First and second workpiece engaging surfaces are respectively formed on the second ends of the first and second workpiece engaging means for engaging a workpiece when the first and second workpiece engaging means are pivoted to the second position.

In one embodiment, the cam means comprises first and second, identical cams which are formed in each of the first and second workpiece engaging means. Each of the cams is formed with a first linear portion which is disposed at an inclined angle with respect to the linear motion axis of the linear drive member and a second, contiguous end portion disposed at a predetermined angle with respect to the first linear portion.

The cam follower means preferably comprises a pin mounted on the linear drive member. First and second ends of the pin extend outward from the linear drive member. Pairs of cam follower members are mounted on each of the first and second ends of the pin to engage one of the cams in the first and second workpiece engaging means.

In a preferred embodiment, the linear drive means comprises a fluid operated cylinder having a reciprocal cylinder rod. A support member is mounted on the cylinder and forms an attachment surface for pivotally receiving the first ends of the first and second workpiece engaging means.

In another embodiment, the workpiece engaging apparatus comprises a linear drive means having a reciprocal drive member. Guide means for guiding the linear movement of the drive member is pivotally mounted to one end to the linear drive means. A first cam means is formed in the guide means. A cam follower means is mounted on the drive member and engages the first cam means in the guide means to control the linear movement of the drive member.

In this embodiment, a workpiece engaging means is pivotally connected to the linear drive means at one end. The workpiece engaging means includes a workpiece engaging portion at a second, opposed end. Second cam means are formed in the workpiece engaging means and engaged by the cam follower means. The second cam means has a predetermined shape to pivot the workpiece engaging means from an open position in which the workpiece engaging portion is spaced from a workpiece and an operative position in which the workpiece engaging portion engages a workpiece as the cam follower means extends with movement of the drive member along the length of the second cam means.

In this embodiment, the first cam means preferably has a straight, linear configuration between its ends. The second cam means in the workpiece engaging means has an arcuate shape, preferably curving at a constant radius, to pivot the workpiece engaging means between the open and workpiece engaging positions.

This latter embodiment of the workpiece engaging apparatus of the present invention is ideally suited for hemming applications in which the edge of a lower metal sheet is bent around the edge of an upper disposed metal sheet. This apparatus is simple in construction and is capable of generating the necessary force to effect the hemming operation.

The apparatus of each embodiment of the present invention is simple in construction and, yet, provides an infinite force or pressure for securely engaging a workpiece. The apparatus can be advantageously employed in gripping applications where workpieces are removed from one work station and transported to an adjacent work station or to an intermediate, idle station.

The cam means employed in the apparatus of the present invention may be designed in a variety of configurations to provide different movements of the first and second workpiece engaging means as well as to vary the pressure generated by the workpiece engaging members of the first and second workpiece engaging means on a workpiece. Further, the workpiece engaging apparatus of the present invention may be modified, such as by simply changing the shape of the cam means, to enable its usage for other applications, such as gripping, clamping, piercing, hemming, etc.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Throughout the following description and drawing, an identical reference number is used to refer to the same component shown in multiple figures of the drawing.

The present invention is an apparatus 10 for engaging workpieces. In one embodiment, the apparatus 10 is designed to act as a gripper to engage or grip a workpiece. The apparatus 10 of the present invention may also be configured for use as a clamp, piercer or hemmer, as described hereafter.

Figure 1:
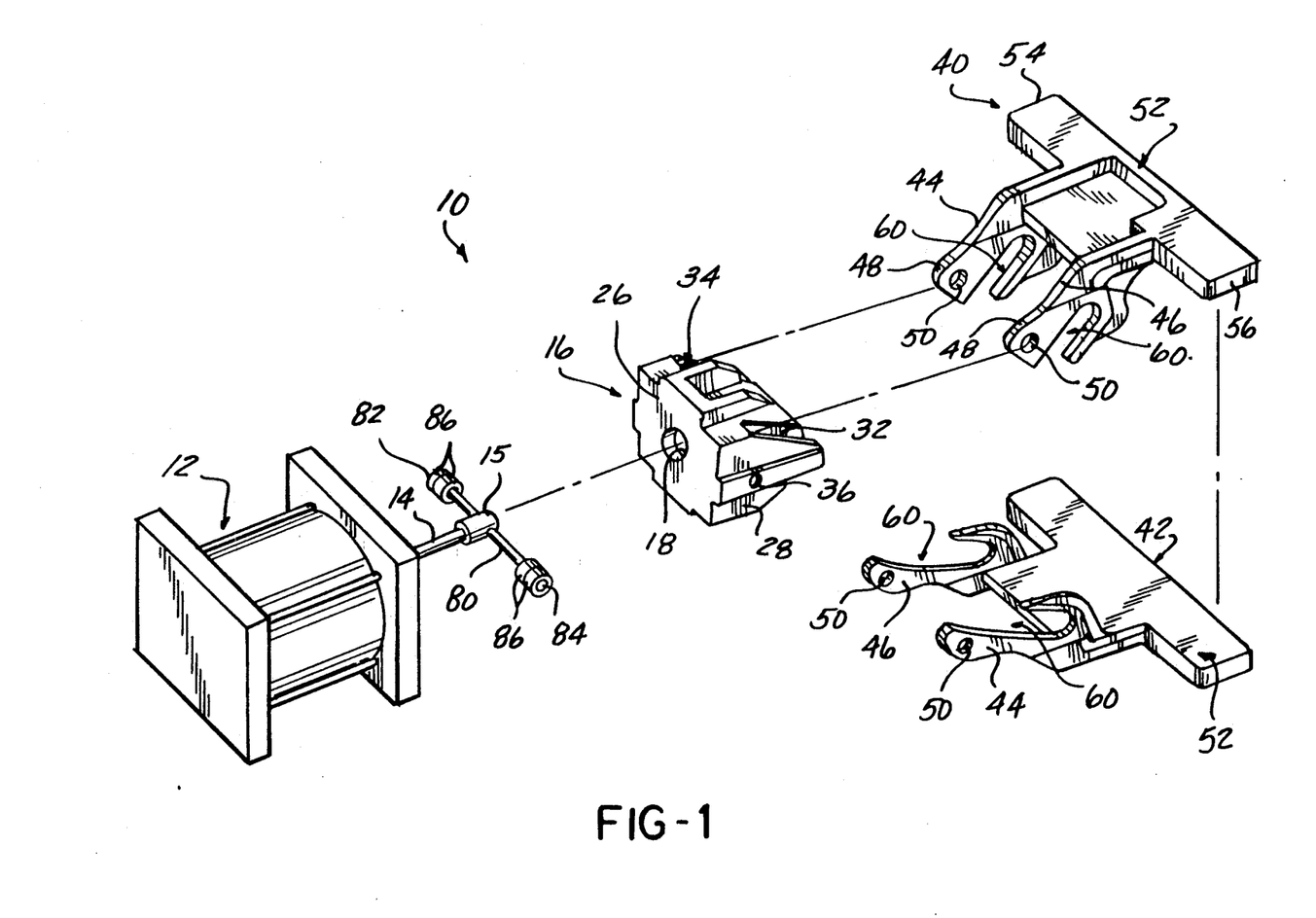
FIG. 1 is an exploded, perspective view of one embodiment of the apparatus of the present invention.

Referring now to the drawing, and to FIG. 1 in particular, the apparatus 10 includes a linear drive means 12 which has an extensible and retractable, reciprocal linear drive member 14 mounted therein. In a preferred embodiment, the linear drive means 12 comprises a fluid operated cylinder, such as a hydraulic or pneumatic cylinder. The linear drive member 14 is a cylinder rod extending outward from one end of the cylinder 12. The cylinder rod 14 reciprocates between extended and retracted positions with respect to the cylinder 12 upon bi-directional activation of the cylinder 12 through conventional valves, not shown. An enlarged, cylindrical cap 15 is mounted on the outer end of the cylinder rod 14. The end of the cylinder rod 14 is attached to the cap 15 by suitable means, such as threads, press fit, welding, etc.

The drive means 12 also includes a support body shown generally by reference number 16 in FIGS. 1, 2, 3 and 4. The support body 16 is mounted to one end of the cylinder 12 and includes a central through bore 18 through which the cylinder rod 14 reciprocates. The support body 16 includes a centrally located sleeve denoted in general by reference number 20. The through bore 18 extends longitudinally through the central sleeve 20 as shown in detail in FIG. 4. Opposed slots 22 and 24 are formed in the outer end of the central sleeve 20 and extend inward along the sides of the sleeve 20 for a predetermined distance.

The support body 16 also includes a planar mounting surface 26 which is placed in registry with one end of the cylinder 12 and secured thereto by suitable mounting means, such as fasteners, not shown. A pair of side arms 28 and 30 are mounted on the support body 16 and are disposed on opposite sides of the central sleeve 20. The side arms 28 and 30 are spaced from the peripheral side walls of the central sleeve 20 to define slots 32 and 34 between each side arm 28 and 30 and the central sleeve 20. Bores 36 are formed in each of the side arms 28 and 30 and are aligned with threaded bores 38 formed in the central sleeve 20. The bores 36 and 38 receive pivot pin connections as described hereafter.

The apparatus 10 also includes first and second workpiece engaging means 40 and 42. In the application of the apparatus 10 for use as a gripper, the first and second workpiece engaging means 40 and 42, respectively, operate as gripper means. It will be understood that other uses for the first and second workpiece engaging means 40 and 42 may also be had by slight modification to the shape of such first and second workpiece engaging means 40 and 42.

Further, since the first and second workpiece engaging means 40 and 42 in the first embodiment are identically constructed; although mounted in opposed, inverted positions as described hereafter, the following description will be directed only to one of the first and second workpiece engaging means, such as the first workpiece engaging means 40. It will be understood that the second workpiece engaging means 42 has the same construction.

As shown in FIGS. 1, 2, 3, 5 and 6, the first workpiece engaging means 40 includes first and second identical arms 44 and 46. Each of the arms 44 and 46 has a first end 48 and a second end which forms a part of the workpiece engaging member, as described hereafter. The first and second arms 44 and 46 are spaced a predetermined distance apart.

Figure 2:
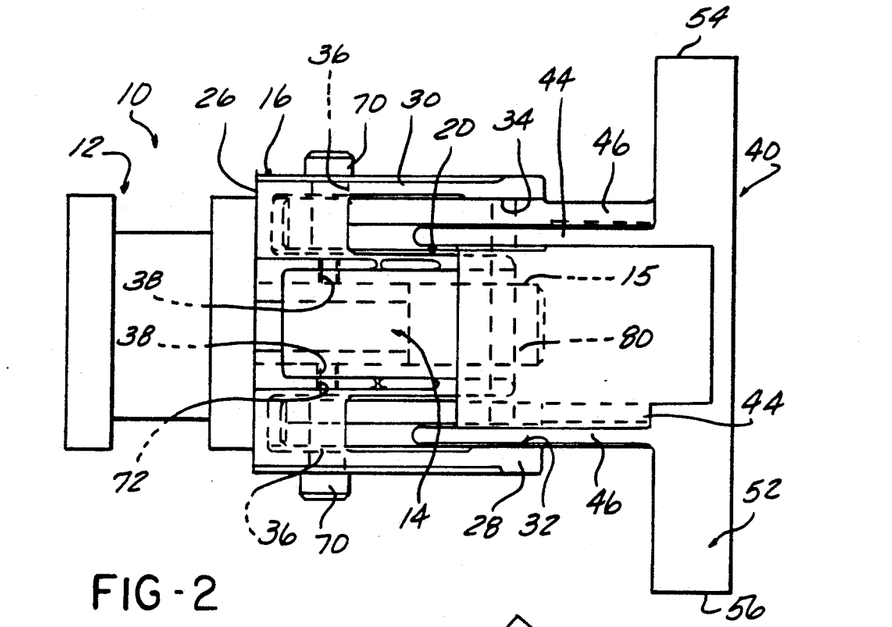
FIG. 2 is a plan elevational view of the assembled apparatus shown in FIG. 1.

Aligned bores 50 are formed in the first ends 48 of each of the arms 44 and 46. The bores 50 are alignable with the bores 36 and 38 in the support body 16, as shown in FIG. 2, when the first workpiece engaging means 40 is mounted in the support body 16.

The first workpiece engaging means 40 includes a workpiece engaging surface 52 which, in the described example of the use of the apparatus of the present invention as a gripper, comprises a planar member which acts as a gripper jaw. The planar member 52 is integrally formed with the first and second arms 44 and 46 and extends outward from the second ends of the arms 44 and 46. It will be noted that the side edges 54 and 56 of the planar member of jaw 52 extend outward different distances from the respective arms 44 and 46, the purpose of which will be described in greater detail hereafter.

Figure 3:
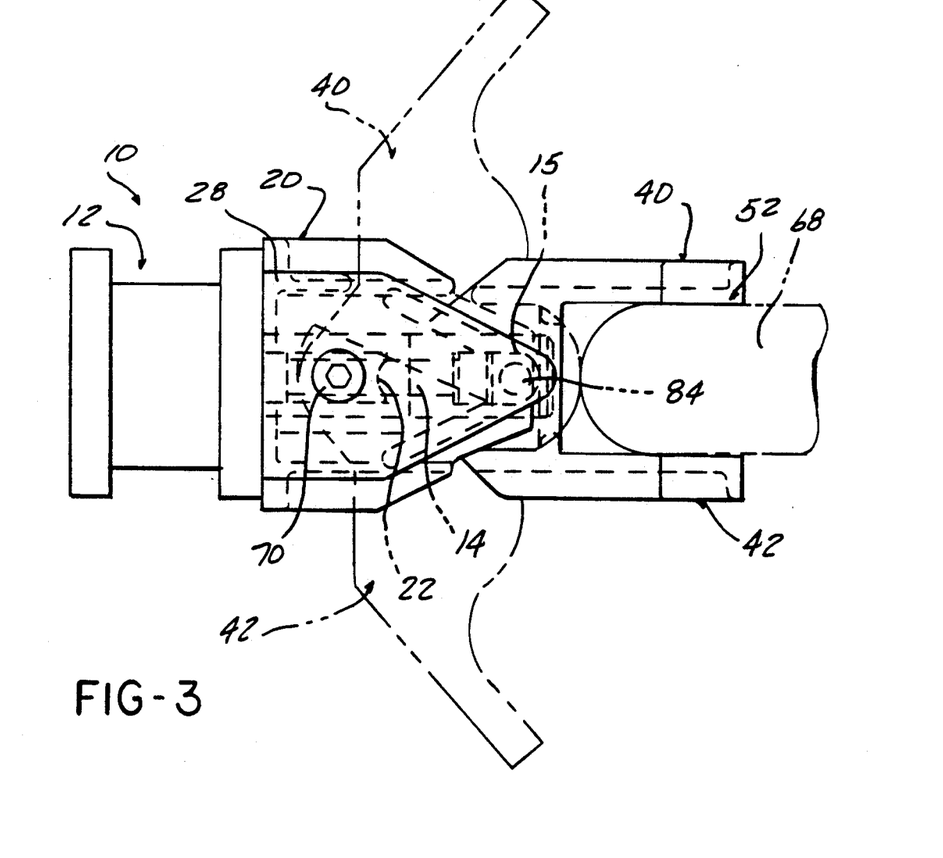
FIG. 3 is a front elevational view of the apparatus shown in FIG. 2.
Figure 4:
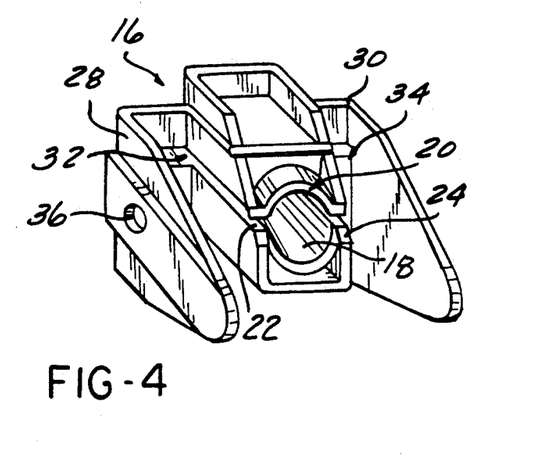
FIG. 4 is a front perspective view of the support body employed in the apparatus shown in FIG. 1.
Figure 5:
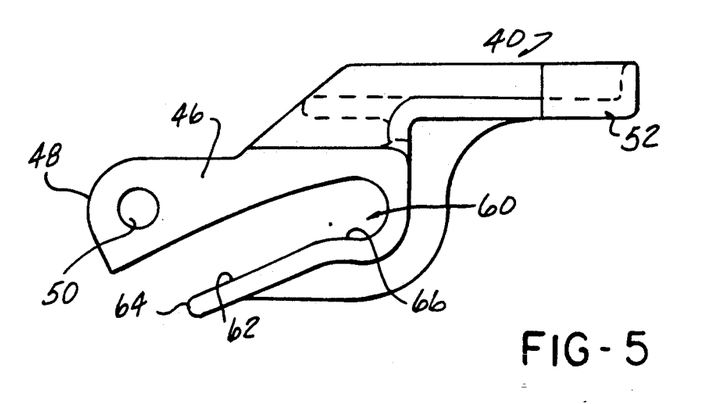
FIG. 5 is a front elevational view of one of the first and second workpiece engaging means shown in FIG. 1.
Figure 6:
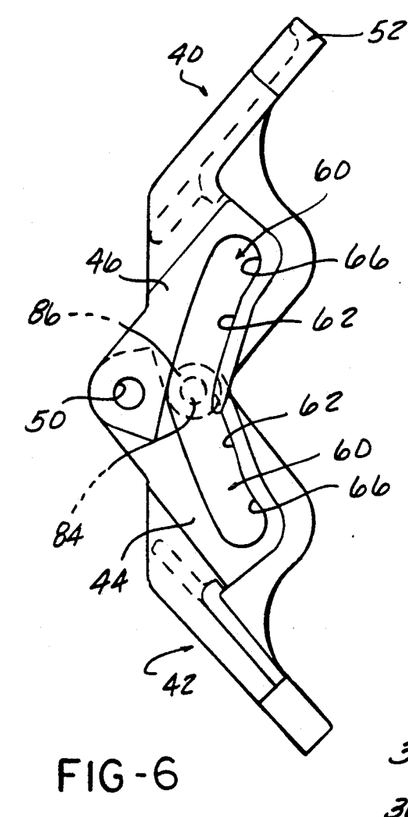
FIG. 6 is a partial, front elevational view showing the position of the workpiece engaging members of the first and second workpiece engaging means in their open position.

As shown in FIGS. 1, 5 and 6, cam means are formed in each of the arms 44 and 46 of the first workpiece engaging means 40. The cam means, denoted in general by reference number 60, are identical in each of the arms 44 and 46. The cam means 60 includes a first linear portion 62 which extends from an open end 64 in the arm 44 or 46 at an inclined angle from the linear motion axis of the cylinder rod 14 when the first workpiece engaging means 40 is in the second closed position, as shown in FIG. 3. The cam means 60 also includes a second angularly inclined portion 66 which is contiguous with the first linear portion 62 and disposed at a predetermined angle with respect to the first linear portion 62.

The first and second workpiece engaging means 40 and 42 are formed of a suitable high-strength material, such as a high-strength steel. Further, the cam means 60 formed in each of the first and second workpiece engaging means 40 and 42 is hardened for durability and long life.

The first and second workpiece engaging means 40 and 42 are disposed in opposed, inverted positions, as shown in FIGS. 1, 2, 3 and 6, with the workpiece engaging surfaces 52 opposing each other and spaced apart a predetermined distance sufficient to securely engage a workpiece 68 shown in phantom in FIG. 3. The first and second workpiece engaging means 40 and 42 are slidably inserted into the slots 32 and 34 formed in the support body 16 and are positioned with the bores 50 in the first ends 48 of each of the arms 44 and 46 aligned with the bores 36 and 38 in the support body 16. Pivot pins 70 are inserted through the aligned bores 36, 38 and 50 to pivotally connect the first end 48 of each of the arms 44 and 46 of the first and second workpiece engaging means 40 and 42 to the support body 16. It should be noted that the outer end 72 of the pivot pin 70 is threaded to threadingly engage and securely retain the pivot pin 70 in the threaded apertures 38 formed in the central sleeve 20 of the support body 16.

As noted above, the outer side edges 54 and 56 of each of the workpiece engaging members 52 of the workpiece engaging means 40 and 42 extend outward different distances from the respective arms 44 and 46. In this manner, when the workpiece engaging means 40 and 42 are disposed in their opposed, inverted positions, the workpiece engaging members or surfaces 52 directly align and the arms 44 and 46 of the inverted, opposed workpiece engaging means 40 and 42 are arranged in side-by-side alignment, as clearly shown in FIG. 2. That is, the arm 44 of the first workpiece engaging means 40 is disposed adjacent to the arm 46 of the second workpiece engaging means 42; while the arm 46 of the first workpiece engaging means 40 is disposed adjacent to the arm 44 of the second workpiece engaging means 42.

The apparatus 10 also includes cam follower means, shown in FIGS. 1, 2 and 3 which engages the cams 60 in the first and second workpiece engaging means 40 and 42 and causes pivotal movement of the first and second workpiece engaging means 40 and 42 from a first spaced-apart, open position shown in phantom in FIG. 3 and solid in FIG. 6 to a second, gripping or workpiece engaging position shown in solid in FIG. 3. The cam follower means comprises a cross pin 80 which is mounted in the enlarged cap 15 affixed to the end of the cylinder rod 14. The cross pin 80 has first and second ends 82 and 84 which extend outward from the cylinder rod 14 and the enlarged cap 15. Pairs of cam follower members 86 are mounted on each of the first and second ends 82 and 84 of the cross pin 80. The cam follower members 86 may comprise rollers or bushings and are adapted to engage the cams 60 in the arms 44 and 46 of each of the first and second workpiece engaging means 40 and 42.

In assembling the apparatus 10, the first and second workpiece engaging means 40 and 42 are disposed in opposed, inverted position with respect to each other and the arms 44 and 46 thereof arranged side by side and inserted into the slots 32 and 34 in the support body 16. The first ends of the arms 44 and 46 of each of the first and second workpiece engaging means 40 and 42 are pivotally connected to the support body 16 by the pivot pins 70. With the cylinder rod 14 of the drive means or fluid operated cylinder 12 in its retracted position, the cam follower members 86 on the ends of the cross pin 80 will be disposed at the open end 64 of each of the cams 60 at the beginning of the first linear portion 62 of each of the cams 60 in the arms of the first and second workpiece engaging means 40 and 42 as shown in FIG. 6. This causes the first and second workpiece engaging means 40 and 42 to be disposed in the open, spaced-apart position shown in solid in FIG. 6 and in phantom in FIG. 3.

When the drive means or cylinder 12 is activated to cause extension of the cylinder rod 14, linear movement of the cylinder rod 14 to its extended position shown in FIG. 1, causes the cam follower members 86 on the ends of the cross pin 80 to traverse the first linear portions 62 of each of the cams 60 in the first and second workpiece engaging means 40 and 42. This causes the first and second workpiece engaging means 40 and 42 to pivot from the open position shown in FIG. 6 to the closed, second position shown in FIG. 3 in which the workpiece engaging surfaces 52 of each of the first and second workpiece engaging means 40 and 42 securely engage or grip a workpiece 68 as shown in FIG. 3.

After the cam follower members 86 traverse the full length of the first linear portion 62 of each of the cams 60, the cam follower members 86 will enter the second angular portion 66 of each of the cams 60. This effectively locks the members 40 and 42 about the workpiece 68. Further, a high pressure or gripping force is exerted on the first and second workpiece engaging means 40 and 42 which securely engages the first and second workpiece engaging means 40 and 42 with the workpiece 68. This pressure can be infinite depending upon the angular position of the second angular portion 66 of the cams 60. Varying degrees of pressure may be attained by varying the shape, length or angular orientation of the second portion 66 of each of the cams 60.

For example, if the apparatus 10 is designed for a piercing operation, in which a punch is mounted on the first workpiece engaging means 40 and a button, having a centrally located bore or hole, is mounted on the second workpiece engaging means 42, lengthening of the second angular portion 66 of the cam 60 will enable the punch to drive through the workpiece 68 into the bore in the button to create an aperture in the workpiece 68.

A subsequent, reverse activation of the cylinder or drive means 12 causes a retraction of the cylinder rod 14. During the retraction of the cylinder rod 14, the cam follower members 86 on the cross pin 80 traverse along the cams 60 from right to left in the orientation shown in FIG. 5 and cause the first and second workpiece engaging means 40 and 42 to pivot to the open, spaced apart position shown in solid in FIG. 6.

Referring now to FIGS. 7, 8 and 9A-9D, there is depicted another embodiment of the workpiece engaging apparatus of the present invention. In this embodiment, the workpiece engaging apparatus 100 is designed for use in a hemming operation to bend the edge of one sheet over the edge of another sheet.

The apparatus 100 includes a linear drive means 12 having an extensible and retractable, reciprocal, linear drive member 14 mounted therein. As in the embodiment shown in FIG. 1, the linear drive means 12 comprises a fluid operated cylinder. The linear drive member 14 is a cylinder rod reciprocally mounted in the cylinder 12 and extending outward from one end of the cylinder 12. Valves, not shown, reciprocate the cylinder rod 14 between extended and retracted positions.

Figure 7:
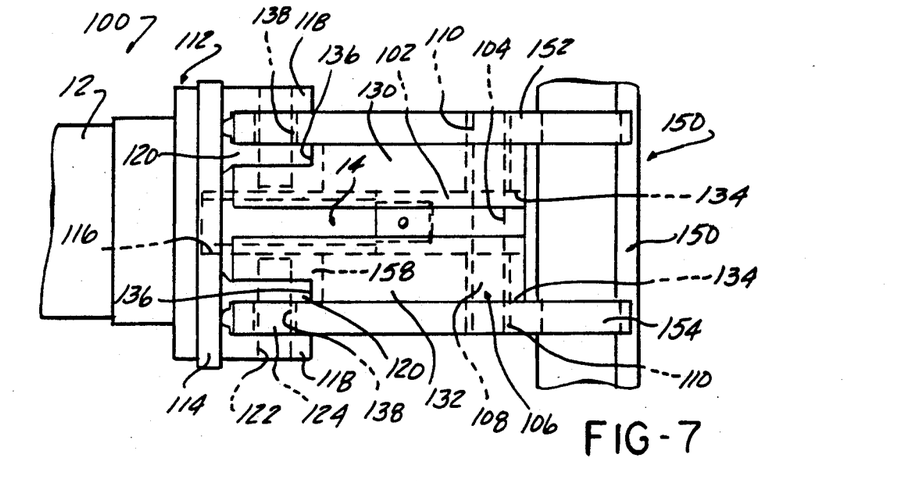
FIG. 7 is a plan elevational view of another embodiment of the apparatus of the present invention.

An enlarged cylinder rod end cap 102 is mounted to the outer end of the cylinder rod 14. The end cap 102 has a generally square cross section and extends a distance from the outer end of the cylinder rod 14, as shown in FIG. 7. The end cap 102 is attached to the cylinder rod 14 by suitable means, such as by welds, threads, set screws, etc.

A bore 104 is formed in the end cap 102 and extends transverse or substantially perpendicular to the axial length of the cylinder rod 14. Cam follower means denoted in general by reference number 106 is mounted in the bore 104 in the end cap 102. The cam follower means 106 preferably comprises a cross pin 108 which is fixedly mounted in the bore 104 and has opposed ends extending outward from the end cap 102. Pairs of bushings 110 are mounted on both outer ends of the cross pin 108.

A frame 112 is attached to the cylinder 12 for mounting the operative components of the workpiece engaging means to the cylinder 12. In a preferred embodiment, the frame 112 comprises a plate 114 which is secured by suitable means, such as welding, fasteners, etc., to the end of the cylinder 12. The plate 114 has a centrally located bore 116 through which cylinder rod 14 extends.

First and second pairs of arms, each comprising an arm 118 and an arm 120 spaced therefrom, are mounted on the plate 114 in a spaced apart arrangement as shown in FIG. 7. The arms 118 and 120 of each pair of arms are secured to the plate 114 by suitable means, such as by welding. As shown in FIG. 7, the ends of the arms 118 and 120 disposed in registry with the plate 114 have a notch portion, the purpose of which will be described in greater detail hereafter. In addition, each of the arms 118 and 120 has a through bore 122 which extends therethrough and is aligned with the corresponding bore 122 formed in the opposed arm of each pair of arms. The aligned bores 122 in each of the pairs of arms 118 and 120 receive a separate pivot pin 124.

Figure 8:
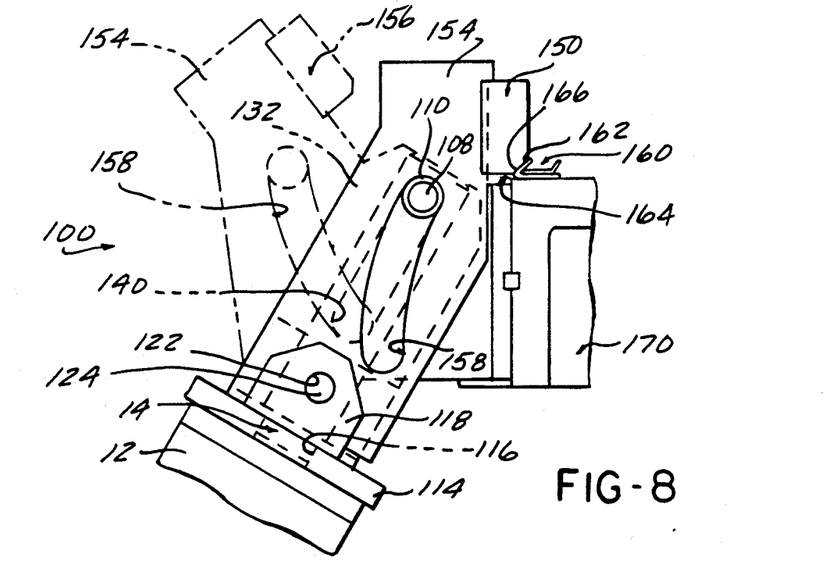
FIG. 8 is a front elevational view of the apparatus shown in FIG. 7.

The apparatus 100 also includes guide means for guiding the linear movement of the drive member 14. The guide means is preferably in the form of first and second block members 130 and 132. The block members 130 and 132 are identically constructed and have a generally rectangular cross section and an elongated, planar form with cut off or notched ends, as shown in FIG. 8. Each of the block members 130 and 132 is provided with a centrally located notch extending from a first end which snugly engages the sides of the cylinder rod end cap 102, as shown in FIG. 7. The opposed or second end of each of the block members 130 and 132 is notched as shown by reference number 136 so as to snugly engage the arm 120 in each pair of arms 118 and 120.

Bores 138 are formed in each of the block members 130 and 132 adjacent the second end and are alignable with the bores 122 formed in each of the arm pairs 118 and 120 so as to slidably receive the pivot pins 124 therethrough to pivotally mount the second end of each of the block members 130 and 132 to the linear drive means 12.

Each of the block guide members 130 and 132 is provided with a first cam means denoted in general by reference number 140 in FIG. 8. Preferably, the first cam means 140 has a straight, linear form between its first and second ends. The bushings mounted on the outer ends of the cross pin 108 ride in the first cam means 140 in each of the block members 130 and 132 to control the linear extension and retraction of the drive member 14. It will be understood that the first cam means 140 may have other shapes, as necessary, for a particular application.

The apparatus 100 also includes workpiece engaging means denoted in general by reference number 150. The workpiece engaging means 150 comprises first and second outer plate members 152 and 154, respectively, and a workpiece engaging member 154. The first and second outer plates 152 and 154 have a generally planar configuration with a rectangular cross section. Bores are formed in one end of each of the first and second outer plates 152 and 154 to receive the pivot pins 124 therethrough to pivotally connect the first ends of each of the first and second outer plates 152 and 154 to the frame 112 attached to the linear drive means 12.

A second cam means denoted by reference number 158 is formed in each of the first and second outer plates 152 and 154, respectively. Each of the second cam means 158 is identically constructed and, preferably, has an arcuate shape curving at a constant radius along its length, as shown in FIG. 8.

Certain of the bushings on the cross pin 108 ride in the second cam means 158 in each of the first and second outer plates 152 and 154 to control pivotal movement of the first and second plates 152 and 154 between a workpiece engaging position shown in solid in FIG. 8 and an open position shown in phantom in FIG. 8 in which the workpiece engaging member 156 is spaced from the workpiece 160. It will be understood that the second cam means 158 may have other configurations, either arcuate at different radiuses or a combination of linear sections disposed at angles with respect to each other, depending upon the particular application for which the apparatus 100 is employed.

The workpiece engaging member 156, in the embodiment shown in FIGS. 7 and 8 which is designed for use in a hemming operation, has a block-like form with a first workpiece engaging edge 162, a second, spaced workpiece engaging edge 164, a flat surface 166 extending between the first and second edges 162 and 164 and a flat bottom surface 167. The workpiece engaging member 156 is secured to the second ends of the first and second outer plates 152 and 154 by suitable means, such as by welding. It will be understood that the shape of the workpiece engaging member 156 as well as its length may be varied to suit a particular application and the shape and size of the workpieces in such applications.

In the hemming application described by way of example only, the workpiece 160 is mounted on a frame 170 typically mounted in a tool or machine. The workpiece 160 in this example comprises a lower disposed metallic sheet 172 having an outer bendable edge or flange 174. An upper sheet 176 is disposed above and in registry with the lower sheet 172, as shown in FIGS. 9A-9D.

The operation of the apparatus 100 in a hemming operation will now be described in detail. It will be assumed that the linear drive member 14 has been retracted within the cylinder 12. In this position, the cross pin 108 carried by the linear drive member 14 has moved to a position adjacent the cylinder 12. During its prior retraction, the cross pin 108 rides within the first and second cams 140 and 158 and causes the first and second outer plates 152 and 154 to pivot about the pivot pins 124 to the position shown in phantom in FIG. 8. In this position, the workpiece engaging member 156 is spaced from the workpiece 160 mounted on the frame 170. As the cylinder 12 is actuated to cause extension of the linear drive member 14, the cross pin 108 traverses the first and second cams 140 and 158 and causes the first and second outer plate members, as well as the block members 130 and 132 to pivot about their interconnected first ends about pivot pins 124. The block members 130 and 132 drive the linear drive means in a linear movement. However, the arcuate shape of the second cam means 158 causes the first and second outer plates 152 and 154 to pivot from the open position shown in phantom in FIG. 8 to the solid position shown in FIG. 8 in which the workpiece engaging member 156 is brought into gradual engagement with the workpiece 160.

Figure 9A:
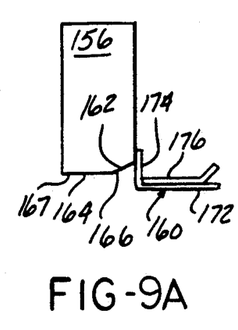
FIGS. 9A, 9B, 9C and 9D are partial, sequential representations of the use of the apparatus shown in FIGS. 7 and 8 in a hemming operation.

FIGS. 9A-9D depict the sequential movement and action of the workpiece engaging member 156 in hemming the outer edge or flange 174 of the lower sheet 170 about the edge of the upper sheet 176. As the workpiece engaging member 156 is brought into engagement with the workpiece 160 during the pivotal movement of the first and second outer plates 152 and 154, as described above, the first edge 162 will initially contact the upturned, perpendicular flange 174 of the lower sheet 172, as shown in FIG. 9A.

Figure 9B:
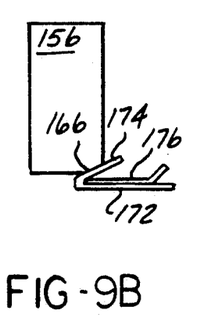
Figure 9C:
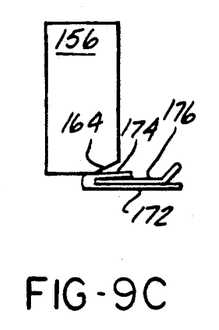

Continued pivotal movement of the first and second outer plates 152 and 154 will bring the flat surface 156 on the workpiece engaging member 156 into engagement with the flange 174 on the lower sheet 172 and cause a pivoting or bending of the flange 174 about the outer edge of the upper sheet 176, as shown in FIG. 9B. This causes the outer flange 174 to be bent to an approximate 45° with respect to the upper sheet 176. Continued pivotal movement of the first and second outer plates 152 and 154 will bring the second edge 164 on the workpiece engaging member 156 into engagement with the flange 174 of the lower sheet 172 resulting in a further bending of the flange 174 about the edge of the upper sheet 176.

Figure 9D:
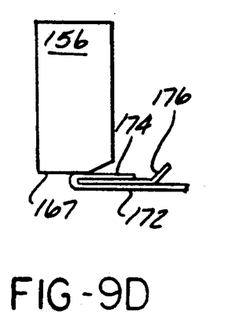

Finally, the workpiece engaging member 156 will be pivoted into the position shown in FIG. 9D in which the lower surface 167 on the workpiece engaging member 156 engages the flange 174 on the lower sheet 172 bending the flange 174 parallel to the remainder of the lower sheet 172 and in registry with the upper sheet 176 to complete the hemming operation.

In summary, there has been disclosed a unique cam operated workpiece engaging apparatus which may be advantageously used in manufacturing operations to secure, engage or perform work on workpieces. The apparatus is of simple construction and is designed to provide infinite pressure or force on a workpiece. Further, the apparatus may be easily modified for use in different applications, such as gripping, clamping, piercing and hemming.

What is claimed is:

1. An apparatus for engaging workpieces comprising:
    linear drive means having a reciprocally extendable and retractable linear drive member;
    first and second, identical, workpiece engaging means, each having first and second ends, the first and second workpiece engaging means disposed in opposed, inverted positions with respect to each other and pivotally connected at the first ends to the linear drive means;
    first and second identical cam means formed in the first and second workpiece engaging means, respectively, the first and second cam means in the first and second workpiece engaging means being disposed in opposed, inverted relation with respect to each other, each of the first and second cam means having linear and non-linear portions contiguous with and disposed at an obtuse angle relative to each other;
    cam follower means, mounted on the drive member, and engaging the first and second cam means in the first and second workpiece engaging means, for pivoting the first and second workpiece engaging means between first and second positions as the linear drive member reciprocates; and
    first and second workpiece engaging surfaces, respectively formed on the second ends of each of the first and second workpiece engaging means, for engaging a workpiece when in a second, closed position.

2. The apparatus of claim 1 wherein each of the first and second cam means comprises first and second, identical, spaced cams formed in each of the first and second workpiece engaging means.

3. The apparatus of claim 2 wherein the cam follower means comprises:
    a pin mounted on the linear drive member, the pin having first and second ends extending outward from opposite sides of the linear drive member; and
    a pair of cam follower members mounted on each of the first and second ends of the pin for engaging the first and second cam means in each of the first and second workpiece engaging means.

4. The apparatus of claim 1 wherein the linear drive means comprises:
    a fluid operated cylinder;
    the linear drive member being formed as a cylinder rod extensibly and retractably mounted in the cylinder and extending outward from the cylinder; and
    a support member mounted on the cylinder, the ends of the first and second workpiece engaging means being pivotally connected to the support member.

5. An apparatus for engaging a workpiece comprising:

a fluid operated cylinder having an extensible and retractable cylinder rod mounted therein and extending outward from the cylinder;

a support body mounted on the cylinder, the cylinder rod reciprocally extending through the body;

cam follower means mounted on and movable with the cylinder rod;

first and second workpiece engaging means, each having first and second ends, the first and second workpiece engaging means being disposed in opposed, inverted position with respect to each other and pivotally connected at the first ends to the support body;

identical cam means formed in each of the first and second workpiece engaging means and disposed in opposed, inverted relationship with respect to the cam means formed in the opposed one of the first and second workpiece engaging means, each of the cam means having linear and non-linear portions contiguous with and disposed at an obtuse angle relative to each other;

the cam follower means engaging the cam means in the first and second workpiece engaging means during linear reciprocal movement of the cylinder rod to move the first and second workpiece engaging means between a first, open, spaced-apart position when the cylinder rod is retracted to a second, closed position when the cylinder rod is extended; and a workpiece engaging member formed on the second end of each of the first and second workpiece engaging means.

6. The apparatus of claim 5 wherein:

each of the first and second workpiece engaging means includes first and second spaced arms, each of the first and second spaced arms having a first end;

the first ends of each of the first and second spaced arms being pivotally connected to the support body; and first and second identical, spaced cams formed in each of the first and second arms.

7. The apparatus of claim 5 wherein the cam follower means comprises:

a pin fixedly to the cylinder rod and extending outward from opposite sides of the cylinder rod; and the cam follower means being mounted on the ends of the pin and slidably engaging the cam means in the first and second workpiece engaging means.

8. The apparatus of claim 7 wherein the cam follower means comprises:

two cam follower members mounted on each of the first and second ends of the pin, each cam follower member engaging one of the cam means formed in one of the first and second workpiece engaging means.

9. An apparatus for engaging workpieces comprising:

linear drive means having a reciprocally extendable and retractable linear drive member;

first and second, identical, workpiece engaging means, each having first and second ends, the first and second workpiece engaging means disposed in opposed, inverted positions with respect to each other and pivotally connected at the first ends to the linear drive means;

first and second identical cam means formed in the first and second workpiece engaging means, respectively, the first and second cam means in the first and second workpiece engaging means being disposed in opposed, inverted relation with respect to each other, each of the first and second cam means having linear and non-linear portions contiguous with and disposed at an obtuse angle relative to each other, the linear portion being substantially longer than the non-linear portion;

cam follower means, mounted on the drive member, and engaging the first and second cam means in the first and second workpiece engaging means, for pivoting the first and second workpiece engaging means between first and second open position and a second closed position as the linear drive member reciprocates and the cam follower means traverses the first portion of each of the first and second cam means and for exerting additional force on the workpiece engaging means as the cam follower means traverses the second portion from the first portion of each of the first and second cam means; and first and second workpiece engaging surfaces, respectively formed on the second ends of each of the first and second workpiece engaging means, for engaging a workpiece when in a second, closed position.

* * * * *